(12) United States Patent
Takahashi et al.

(10) Patent No.: US 7,859,522 B2
(45) Date of Patent: Dec. 28, 2010

(54) TOUCH PANEL DEVICE AND CONTROL METHOD AND DEVICE FOR ELIMINATING NOISES IN TOUCH PANEL DEVICE

(75) Inventors: Yuji Takahashi, Kawasaki (JP); Fumihiko Nakazawa, Kawasaki (JP); Satoshi Sano, Kawasaki (JP); Takashi Katsuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 884 days.

(21) Appl. No.: 11/204,056

(22) Filed: Aug. 16, 2005

(65) Prior Publication Data

US 2006/0214921 A1 Sep. 28, 2006

(30) Foreign Application Priority Data

Mar. 23, 2005 (JP) ............................. 2005-083817

(51) Int. Cl.
*G06F 3/043* (2006.01)
(52) U.S. Cl. ...................................... 345/177
(58) Field of Classification Search ................. 345/156, 345/173, 177; 367/907; 178/18.04, 20.01–20.04
See application file for complete search history.

(56) References Cited

U.S. PATENT DOCUMENTS

| | | | | |
|---|---|---|---|---|
| 5,638,093 A | * | 6/1997 | Takahashi et al. | 345/177 |
| 5,691,512 A | * | 11/1997 | Obi | 178/18.04 |
| 6,215,477 B1 | * | 4/2001 | Morrison et al. | 345/173 |
| 6,366,277 B1 | * | 4/2002 | Armstrong | 345/177 |
| 6,805,094 B2 | | 10/2004 | Hashimoto et al. | |
| 7,301,525 B2 | * | 11/2007 | Chang et al. | 345/173 |
| 2002/0089491 A1 | * | 7/2002 | Willig | 345/173 |
| 2004/0090432 A1 | * | 5/2004 | Takahashi et al. | 345/173 |
| 2004/0104827 A1 | | 6/2004 | Katsuki et al. | |

(Continued)

FOREIGN PATENT DOCUMENTS

JP 2003-237547 A 8/2003

(Continued)

OTHER PUBLICATIONS

Office Action from the Japanese Patent Office dated Mar. 24, 2009 in the corresponding Japanese Patent Application No. JPA2005-083817, No.

*Primary Examiner*—Chanh Nguyen
*Assistant Examiner*—Allison Walthall
(74) *Attorney, Agent, or Firm*—Westerman, Hattori, Daniels & Adrian, LLP

(57) ABSTRACT

A touch panel device includes an excitation transducer for exciting a surface acoustic wave upon application of a burst wave and a reception transducer for receiving the surface acoustic wave and converting the same into a reception signal that are arranged at a peripheral portion of a detection area so that a position of an object touching the detection area is detected in accordance with a change in the reception signal. A control method for eliminating noises in the touch panel device includes the steps of detecting a differential between a reception signal due to a burst wave and another reception signal due to another burst wave, deciding that there is a noise if the detected differential exceeds a preset threshold value, and performing a control operation so that the detection of an object based on the reception signal is not performed in accordance with the decision.

8 Claims, 12 Drawing Sheets

U.S. PATENT DOCUMENTS

2004/0178998 A1* 9/2004 Sharp et al. .................. 345/177
2006/0139339 A1* 6/2006 Pechman et al. ............. 345/177

FOREIGN PATENT DOCUMENTS

| JP | 2003-343326 A | 12/2003 |
| JP | 2004-157620 A | 6/2004 |
| JP | 2004-171213 | 6/2004 |

* cited by examiner

TOUCH PANEL DEVICE AND CONTROL METHOD AND DEVICE FOR ELIMINATING NOISES IN TOUCH PANEL DEVICE

BACKGROUND OF THE INVENTION

1. Field of the Invention

The present invention relates to a touch panel device for detecting a touch position of an object such as a finger by detecting a position where a surface acoustic wave is attenuated due to a touch of the object, and a control method and a control device for eliminating noises in the detection.

2. Description of the Prior Art

Such a touch panel device is often used as an input device of a personal computer, a mobile computer or a portable information terminal (or a personal digital assistant, PDA). A user of the touch panel device can enter information by touching a display screen of a display device with a finger or a pen.

There is one type of the touch panel device, which utilizes a surface acoustic wave (SAW). This includes transducers arranged at sides of a touch area for exciting a surface acoustic wave or receiving the same. When a finger or the like touches the touch area, the touch position is detected based on a position where the surface acoustic wave is attenuated. The applicant has proposed one type of such touch panel devices in Japanese unexamined patent publication No. 2004-171213. This touch panel device uses transducers having an electrode structure in which a piezo-electric thin film is sandwiched between a comb electrode and a plate electrode so that only one electrode is arranged on one face (a single phase transducer, SPT) and has a chevron-shaped electrode structure in which plural V-shaped comb electrodes are arranged successively.

The touch panel device includes a rectangular transparent substrate and four transducers disposed on the substrate. Two of the four transducers are for excitation arranged at the upper and the lower sides of the substrate, and the other two are transducers for reception arranged at the right and the left sides of the same. The portion surrounded by the four transducers is the touch area.

An excitation voltage of a burst wave is alternately applied to the transducers arranged at the upper and the lower sides so as to generate a surface acoustic wave. The generated surface acoustic wave propagates on the substrate in a diagonal direction so that the transducers arranged at the right and the left sides can receive the same. The surface acoustic wave propagates in parallel with the diagonal line. Therefore, the closer to the diagonal line, the longer a propagation distance as well as a time period until arrival is. Accordingly, the transducer for reception produces a sequential reception signal (time domain waveform) due to one burst wave.

When a finger, a pen or the like touches a position in the touch area, the surface acoustic wave is attenuated at the touched position. Responding to it a level of the reception signal drops, so the position touched by the finger or the like can be detected base on the position where the level drops.

In order to detect the drop of the level of the reception signal (the time domain waveform), a difference between the signal and a time domain waveform (slice data) stored in a memory in advance is determined. If there is a drop of the level due to a touch of a finger or the like, the difference increases. When this difference exceeds a threshold value (a slice level), it is decided that a finger or the like touched. If the slice level is set to a smaller value, a small value of the difference can be detected. In other words, detection sensitivity (touch sensitivity) increases.

A pressure (weight) of contact with a finger or the like is substantially proportional to an attenuation level of the surface acoustic wave. It is preferable to use a slice level as small as possible in order to detect a small pressure applied by a finger or the like.

As described above, it is preferable to set the slice level as small as possible for improving detection sensitivity. However, it is found that there is a possibility of fluctuation generated by a dirty surface of the touch area or noises of incoming radio wave, and the fluctuation is not negligible to the detection sensitivity of the received time domain waveform. In other words, if the detection sensitivity is increased, the difference generated by the fluctuation due to the noises or the like may exceed the threshold value, resulting in an error of detection.

As a countermeasure against this problem, it is possible to add a smoothing process on the received time domain waveform so as to reduce the fluctuation. Thus, the influence of the noises or the like can be reduced substantially. However, once a noise like a spike noise having a large variation is picked up, it is very difficult to eliminate such a noise, which may cause an error of detection.

In particular, as cellular phones have become widespread recent years, influences of noises due to microwave radio waves emitted by the cellular phones have become non-negligible.

SUMMARY OF THE INVENTION

An object of the present invention is to improve detection sensitivity of a touch panel device and prevent an error of detection due to an influence of noises generated by a cellular phone or the like.

A control method according to the present invention is used for eliminating noises in a touch panel device including an excitation transducer for exciting a surface acoustic wave upon application of a burst wave and a reception transducer for receiving the surface acoustic wave and converting the same into a reception signal that are arranged at a peripheral portion of a detection area so that a position of an object touching the detection area is detected in accordance with a change in the reception signal. The control method includes the steps of detecting a differential between a reception signal due to a burst wave and another reception signal due to another burst wave, deciding that there is a noise if the detected differential exceeds a preset threshold value, performing a control operation so that the detection of an object based on the reception signal is not performed in accordance with the decision.

Preferably, the differential detecting step includes detecting a differential between a reception signal at a time and a reception signal at a previous time. In addition, the control method further includes the steps of stopping an application of the burst wave until a preset wait time passes if the detected differential exceeds the preset threshold value, and restarting the application of the burst wave after the wait time has passed.

In addition, the control method further includes the steps of deciding that there is a noise if a level of a noise floor exceeds a preset second threshold value in a period other than a period in which a reception signal due to the burst wave is obtained, and performing a control operation so that the detection of an object based on the reception signal is not performed in accordance with the decision.

In addition, the control method further includes the steps of stopping an application of the burst wave if a level of a noise floor exceeds a preset second threshold value until a preset wait time passes, and restarting the application of the burst wave after the wait time has passed.

A control device according to the present invention includes a differential detecting portion for detecting a differential between a reception signal due to a burst wave and another reception signal due to another burst wave, a noise detecting portion for detecting a noise when the detected differential exceeds a preset threshold value, and a control portion for performing a control operation so that the detection of an object based on the reception signal is not performed when a noise is detected.

In addition, the control device further includes a count portion for counting the number of times when the detected differential exceeds the preset threshold value and a threshold change portion for changing the threshold value when a count value of the count portion exceeds a predetermined value.

A touch panel device according to the present invention includes an oscillation portion for producing the burst wave plural times, an A/D converter for converting the reception signal into digital reception data, an object detecting portion for detecting a position of an object that touches the detection area by comparing the reception data with reference data that are stored in advance, a differential detecting portion for detecting a differential between reception data due to a burst wave and another reception data due to another burst wave, a noise detecting portion for detecting a noise when the detected differential exceeds a preset threshold value, and a control portion for performing a control operation so that the detection of the object based on the reception data is not performed when a noise is detected.

According to the present invention, it is possible to improve detection sensitivity of a touch panel device and to prevent an error of detection due to an influence of noises generated by a cellular phone or the like.

DESCRIPTION OF THE PREFERRED EMBODIMENTS

Hereinafter, the present invention will be explained more in detail with reference to embodiments and drawings.

Figure 1:
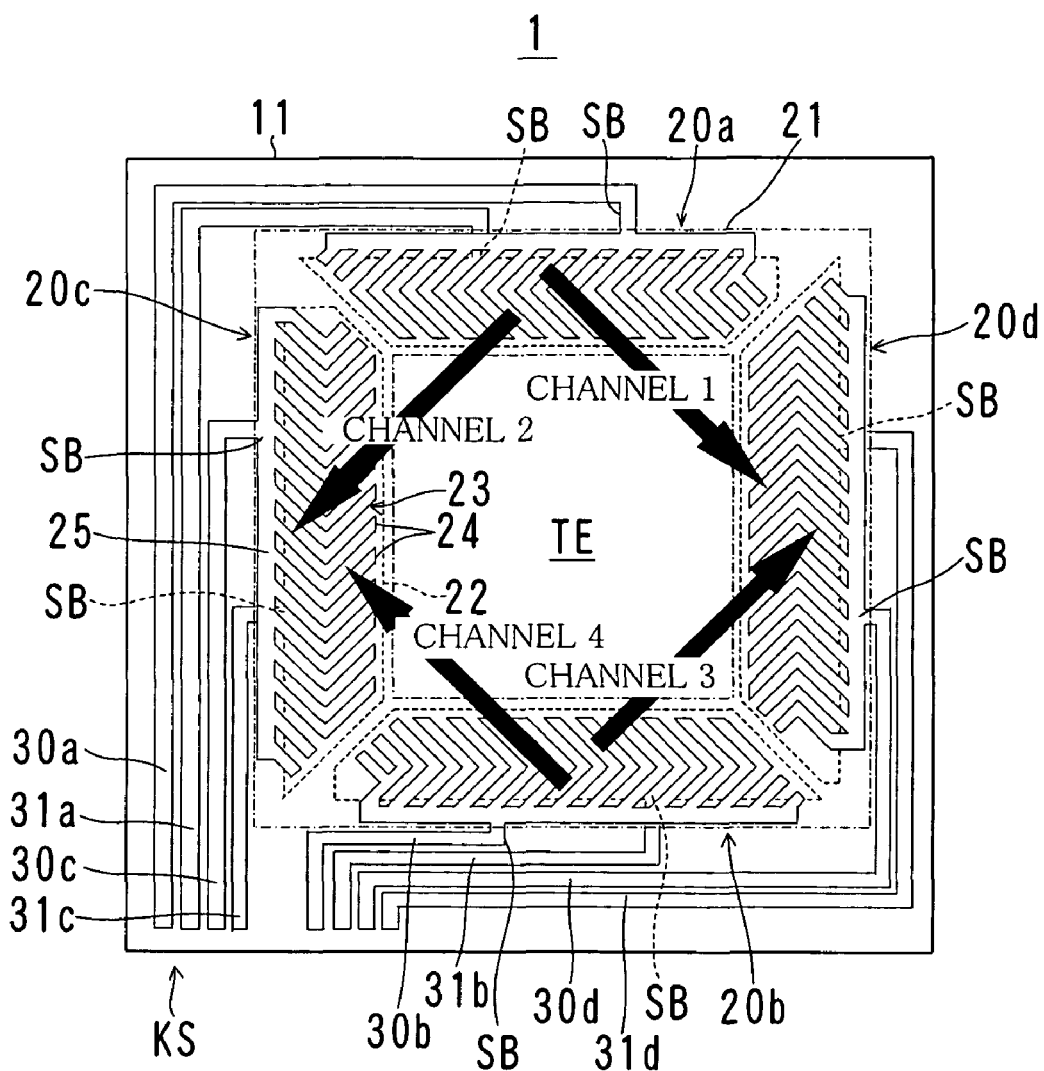
FIG. 1 is a front view of a touch panel device according to an embodiment of the present invention.

FIG. 1 is a front view of a touch panel device 1 according to an embodiment of the present invention.

As shown in FIG. 1, the touch panel device 1 includes a rectangular transparent glass substrate 11, four transducers 20a-20d arranged at the peripheral portion of the glass substrate 11 and wiring electrodes 30a-30d and 31a-31d along the perimeter of the transducers 20a-20d. The middle portion of the touch panel device 1, i.e., a rectangular portion surrounded by the transducers 20a-20d is a touch area TE.

Figure 4:
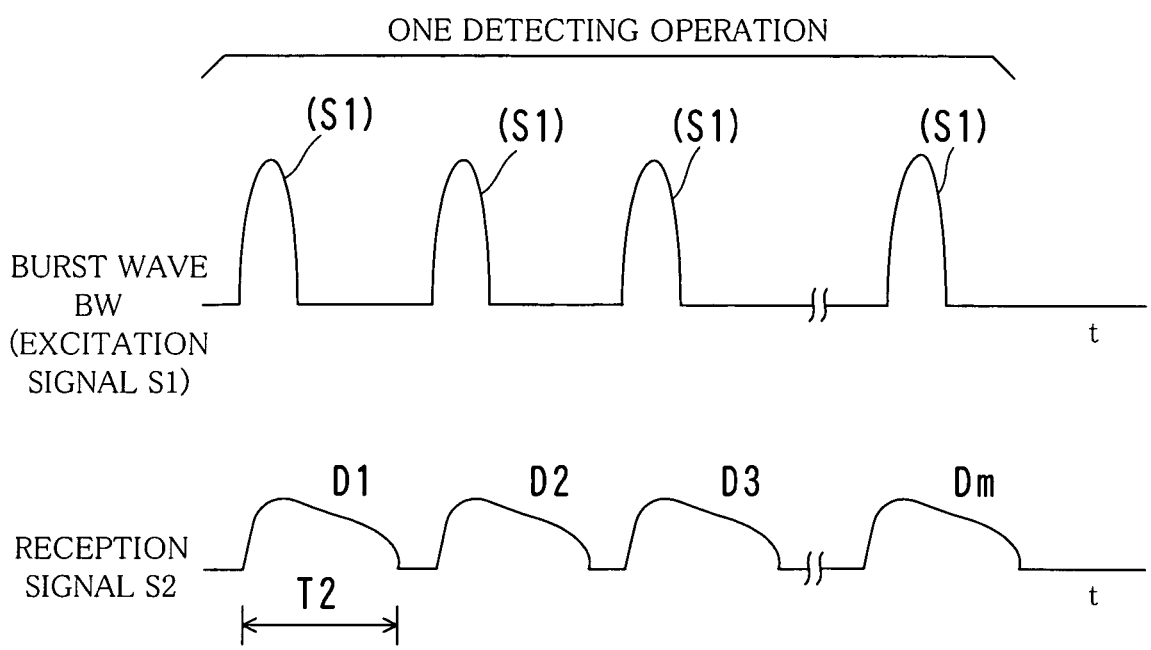
FIG. 4 is a diagram showing examples of an excitation signal and a reception signal.

Two transducers 20a and 20b arranged at the upper side portion and the lower side portion are for excitation, while two transducers 20c and 20d arranged at the left side portion and the right side portion are for reception. The transducers 20a and 20b for excitation are supplied with an excitation voltage (or an excitation signal as shown in FIG. 4) that is a burst wave so that a surface acoustic wave is generated. The generated surface acoustic wave propagates on the glass substrate 11 in a diagonal direction and is received by the transducers 20c and 20d for reception.

More specifically, the surface acoustic wave from the transducer 20a at the upper side portion propagates diagonally toward the lower right direction (channel 1) as well as toward the lower left direction (channel 2), which are received by the transducers 20c and 20d at the right side portion and the left side portion, respectively. In the same way, the surface acoustic wave from the transducer 20b at the lower side portion propagates diagonally toward the upper right direction (channel 3) as well as toward the upper left direction (channel 4), which are received by the transducers 20c and 20d at the right side portion and the left side portion. Note that the excitation voltage is applied to the transducers 20a and 20b for excitation alternatively at different timings.

A time period necessary for the surface acoustic wave to propagate is proportional to a length of the propagation path. Therefore, the time when the surface acoustic wave reaches the transducers 20c and 20d for reception is delayed more at the end portion farther from the transducers 20a and 20b for transmission. Accordingly, a reception signal of each of the transducers 20c and 20d for reception continues while diminishing gradually during a period from first arrival to last arrival of the surface acoustic wave (see FIGS. 4 and 6). When a finger, a pen or the like touches a part in the touch area TE, the surface acoustic wave is attenuated at the touched part. As a result, a level of the reception signal decreases. Therefore, the touch position is detected in accordance with the position where the level of the reception signal decreases.

Figure 2:
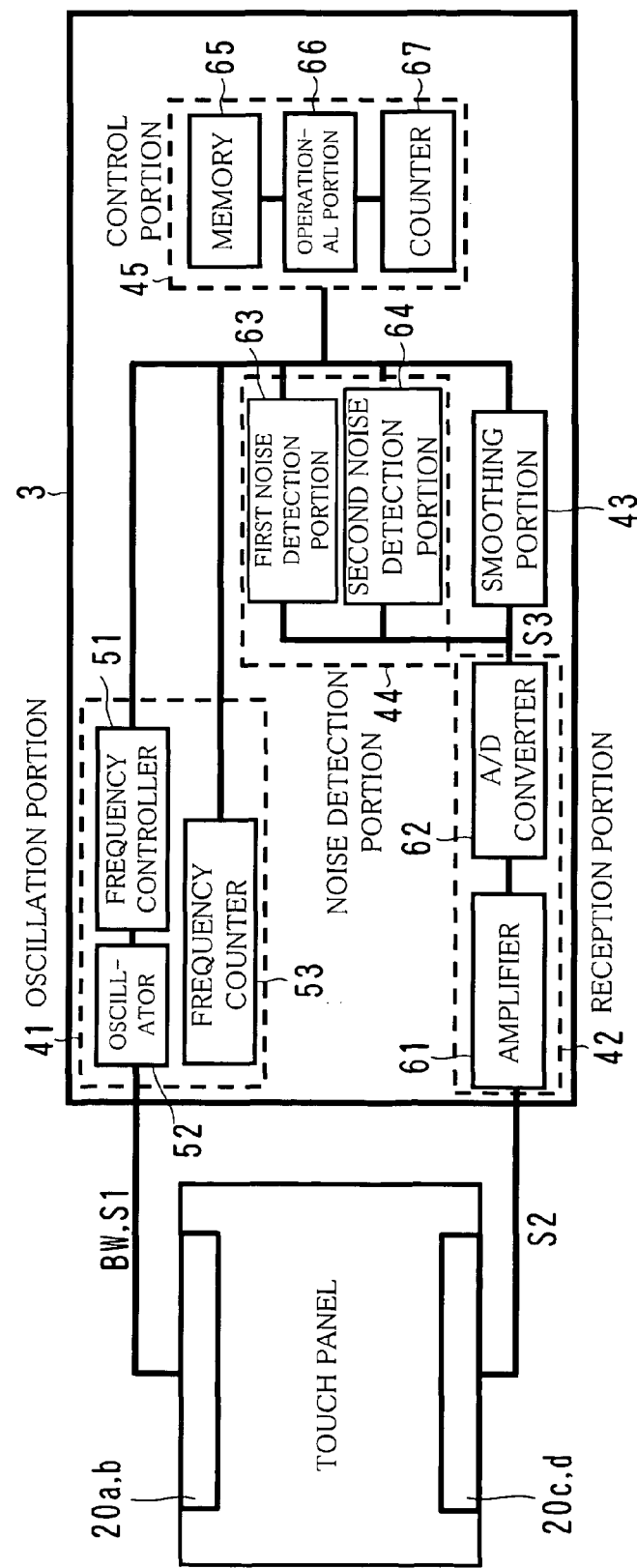
FIG. 2 is a block diagram showing an example of a functional structure of a drive control portion of the touch panel device.
Figure 3:
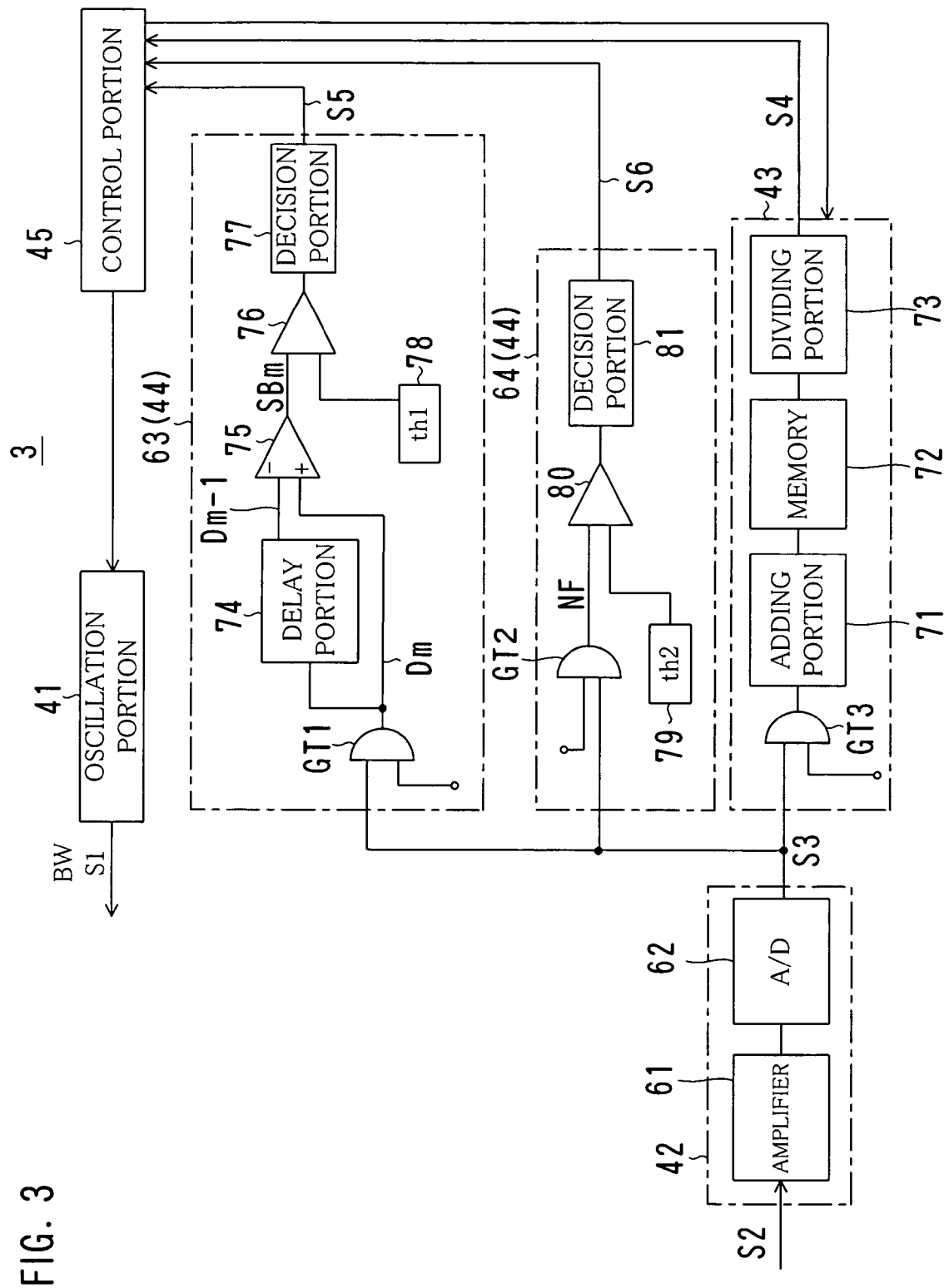
FIG. 3 is a diagram showing an example of a circuit of the drive control portion.
Figure 5:
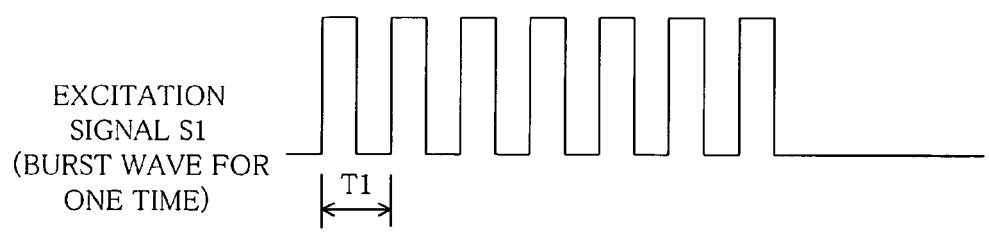
FIG. 5 is a diagram showing the excitation signal for one burst wave.
Figure 6:
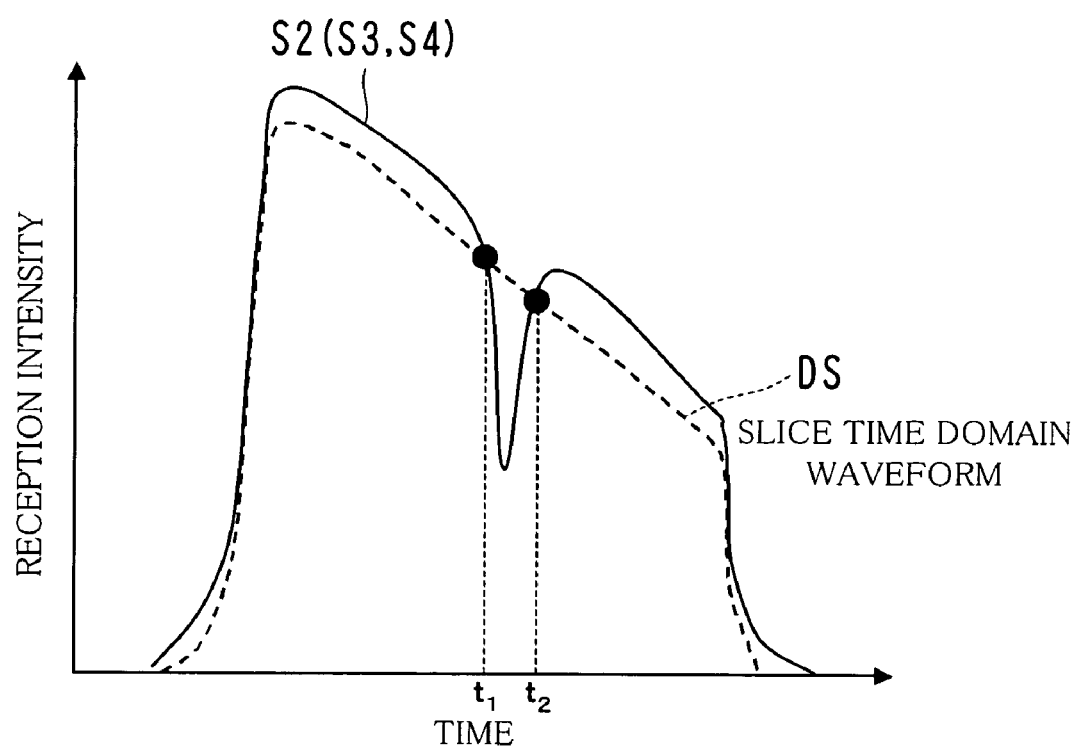
FIG. 6 is a diagram showing an example of the reception signal.
Figure 7:
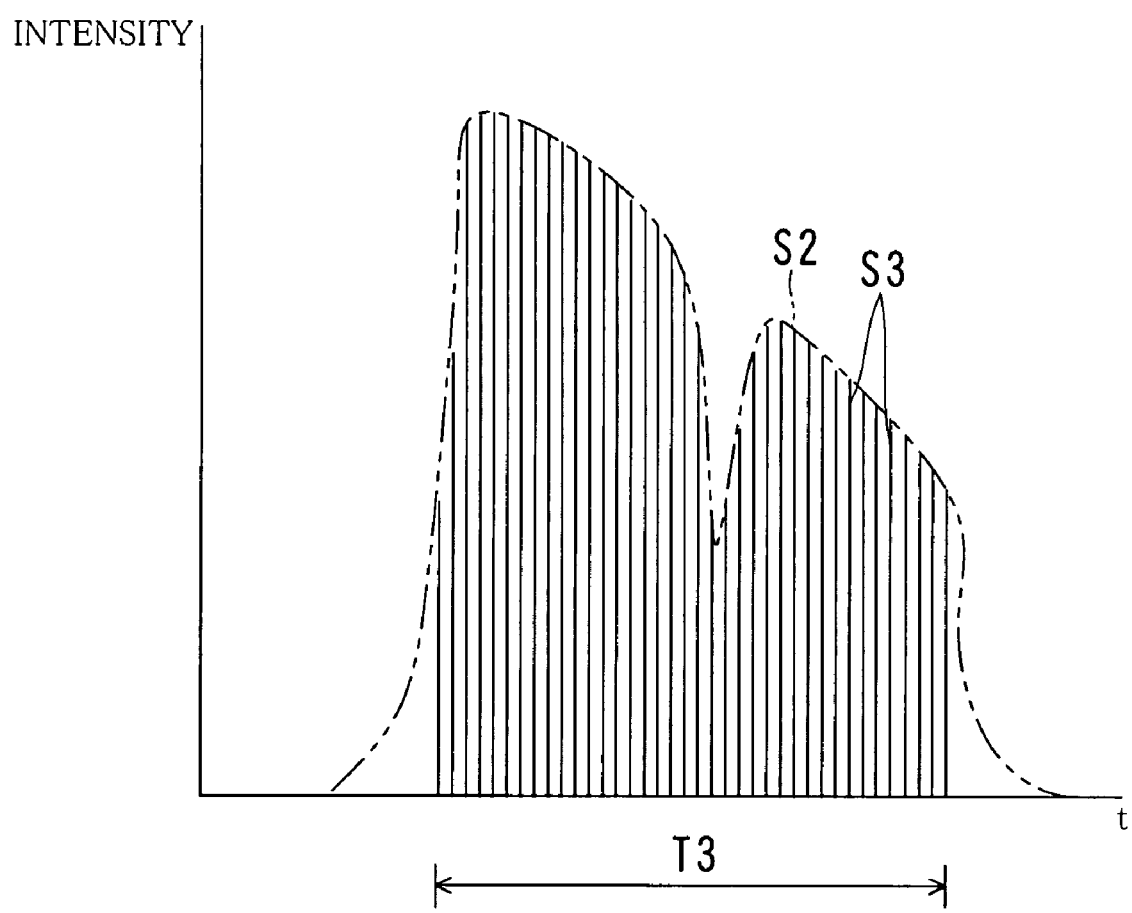
FIG. 7 is a diagram showing A/D conversion of the reception signal into reception data.
Figure 8:
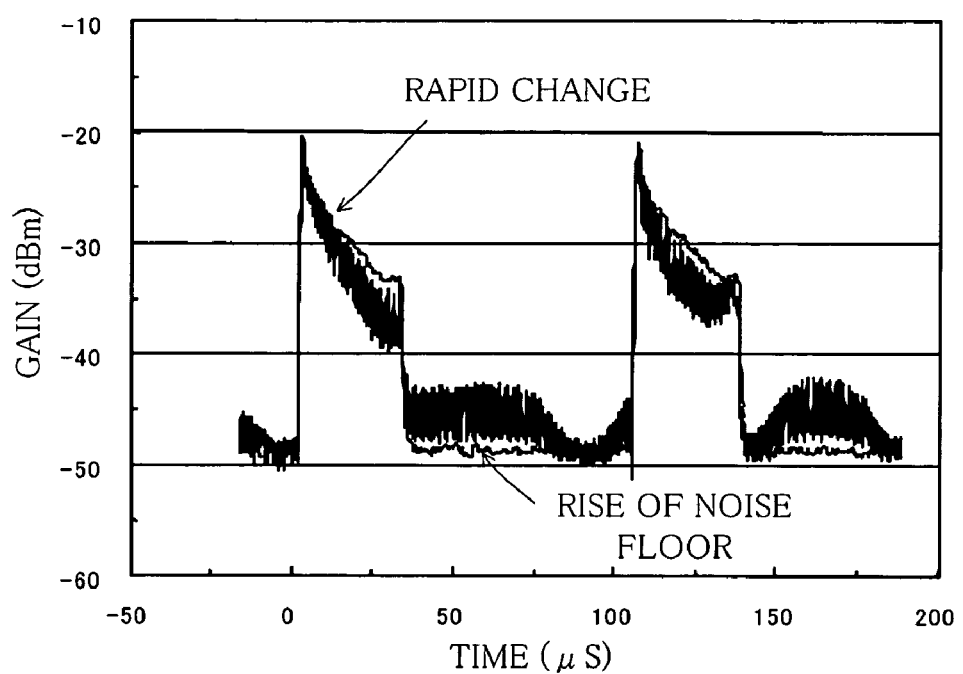
FIG. 8 is a diagram showing an example of the reception signal containing a noise due to a cellular phone.
Figure 9:
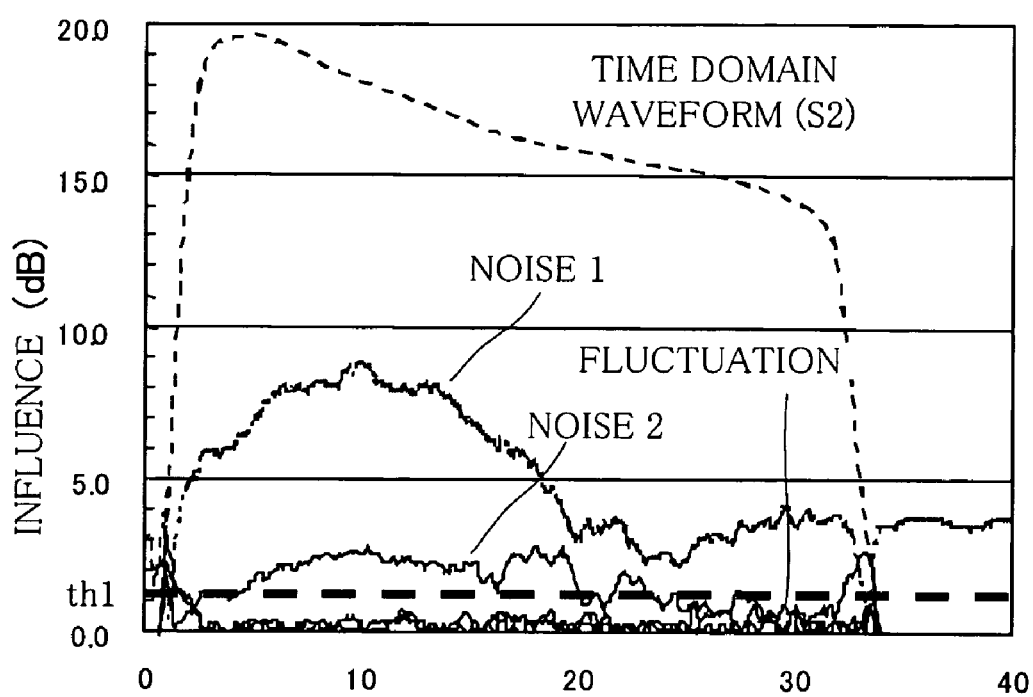
FIG. 9 is a diagram showing an example of a differential of the reception signal containing a noise.
Figure 10:
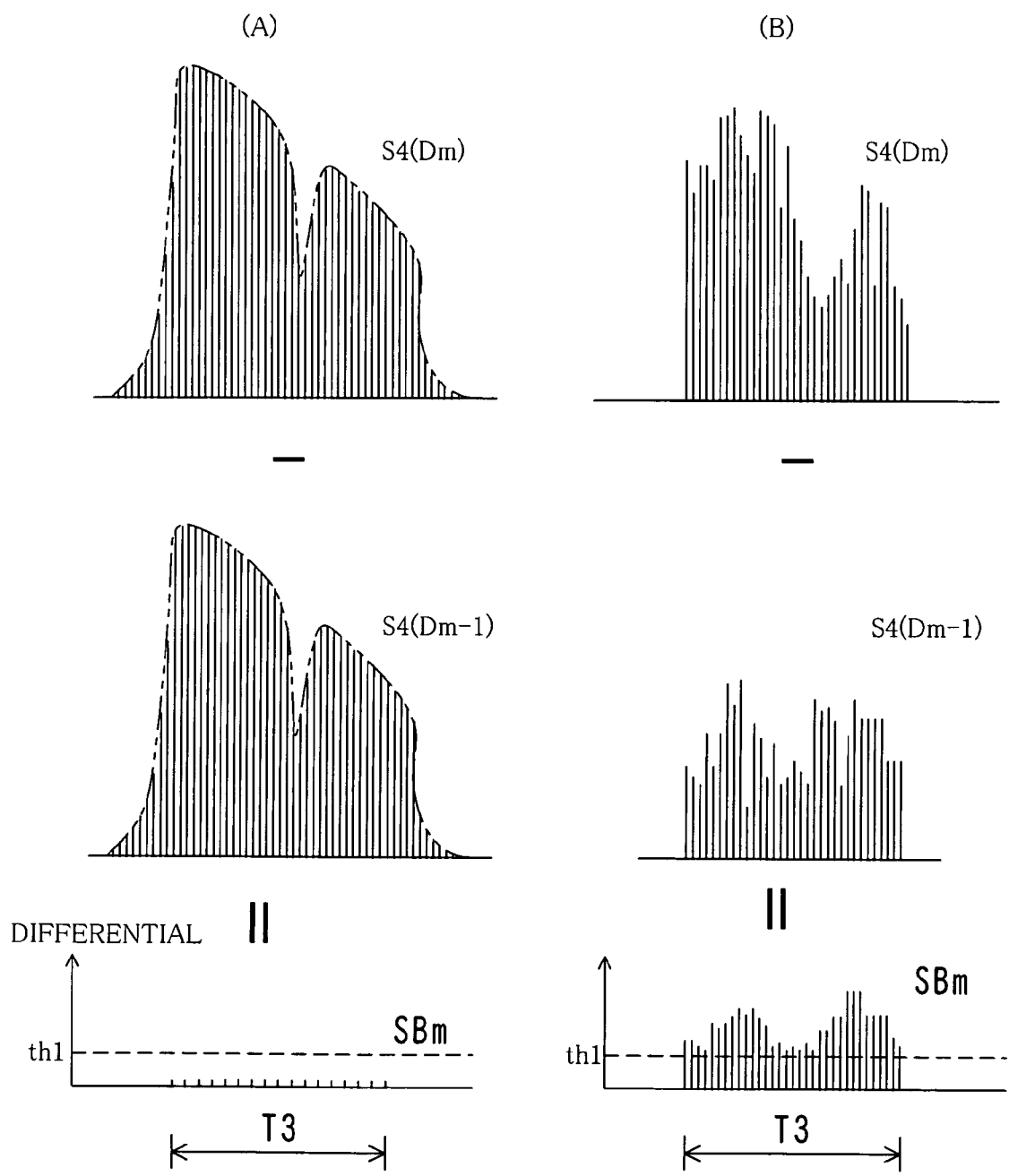
FIG. 10 is a diagram for explaining a principle of noise detection by the differential of the reception signal.
Figure 11:
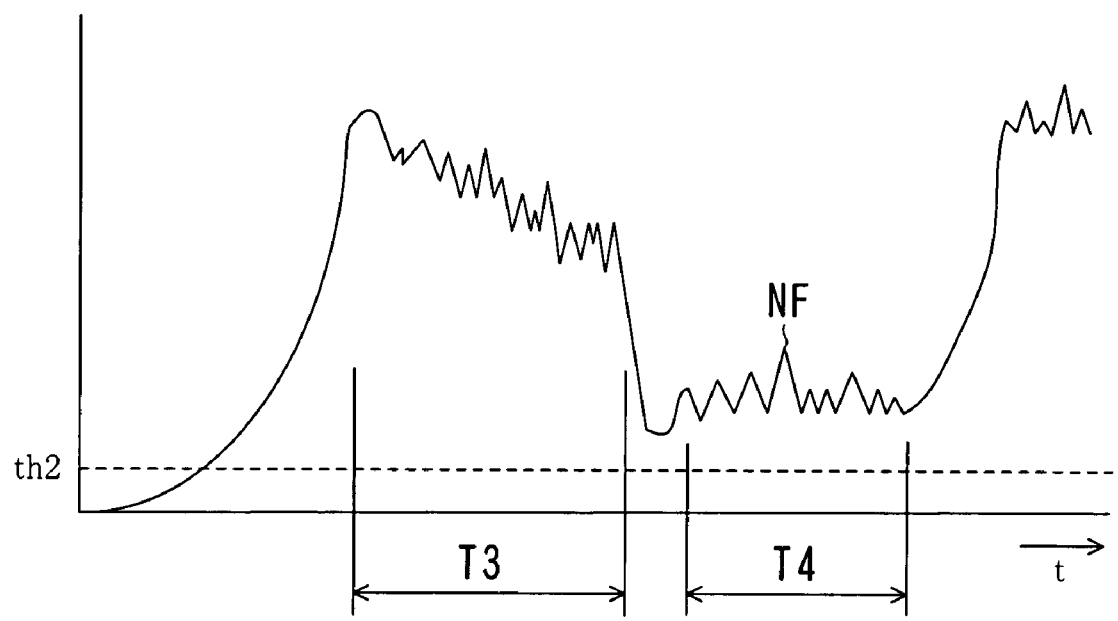
FIG. 11 is a diagram showing the noise detection on a noise floor.

FIG. 2 is a block diagram showing an example of a functional structure of a drive control portion 3 of the touch panel device 1, FIG. 3 is a diagram showing an example of a circuit of the drive control portion 3, FIG. 4 is a diagram showing examples of an excitation signal and a reception signal, FIG. 5 is a diagram showing the excitation signal for one burst wave, FIG. 6 is a diagram showing an example of the reception signal, FIG. 7 is a diagram showing A/D conversion of the reception signal into reception data, FIG. 8 is a diagram showing an example of the reception signal containing a noise due to a cellular phone, FIG. 9 is a diagram showing an example of a differential of the reception signal containing a noise, FIG. 10 is a diagram for explaining a principle of noise detection by the differential of the reception signal, and FIG. 11 is a diagram showing the noise detection on a noise floor.

As shown in FIG. 2, the drive control portion 3 includes an oscillation portion 41, a reception portion 42, a smoothing portion 43, a noise detection portion 44 and a control portion 45.

The oscillation portion 41 is provided for the purpose of applying a burst wave BW to the transducers 20a and 20b for excitation. The oscillation portion 41 includes a frequency controller 51, an oscillator 52 and a frequency counter 53. The oscillator 52 is a voltage controlled oscillator (VCO), and a phase locked loop (PLL) is made up of the oscillator 52 and the frequency controller 51 that uses a quartz resonator. Thus, the oscillator 52 produces an excitation signal S1 that is a pulse train as shown in FIG. 5. Although the rectangular pulse train is used in this embodiment, a sine wave or other waveform signal can be used.

In the frequency counter 53, a value is set in accordance with an instruction by the control portion 45. Depending on the set value, the number of pulses of the excitation signal S1 produced by the oscillator 52 is determined. In other words, when a gate is opened by a reference signal S0, the pulse of the excitation signal S1 is delivered from the oscillator 52 to the transducers 20a and 20b. The frequency counter 53 counts the number of pulses of the excitation signal S1 and closes the gate when the number has reached the set value. The excitation signal S1 that is a pulse train of successively produced pulses constitutes the burst wave BW for one time. As shown in FIG. 4, plural burst waves BW are delivered successively at an appropriate interval for one detecting operation.

Note that the pulse of the excitation signal S1 has a frequency of 20 MHz, a period of 50 ns, a voltage of a few volts, for example. The number of pulses of one burst wave is approximately 10-20, for example. A detection time T2 of the reception signal S2 produced by the transducers 20c and 20d when the surface acoustic wave is received is approximately 50 μs. The number of burst waves BW during one detecting operation is approximately 30-40.

The reception portion 42 is supplied with the reception signal S2 that is delivered by the transducers 20c and 20d. An example of the reception signal S2 is shown in FIG. 6. In the reception signal S2 shown in FIG. 6, there is a drop of the level that appears between the times t1 and t2 due to a touch of a finger or the like on the touch area TE.

The reception portion 42 includes an amplifier 61 and an A/D converter 62. The amplifier 61 amplifies the reception signal S2, and the A/D converter 62 samples the amplified signal at an appropriate period so as to convert it into digital reception data S3. The A/D converter 62 produces the reception data S3 as a result of sampling of the reception signal S2 containing a time domain waveform as shown in FIG. 7. Note that a sampling frequency of the A/D converter 62 is 10 MHz, for example.

The smoothing portion 43 smoothes the reception data S3 during a period T3 (see FIGS. 7, 10 and 11) corresponding to the time domain waveform in each time of the plural burst waves BW for one detecting operation so as to deliver reception data S4 that correspond to an average time domain waveform.

As shown in FIG. 3, the smoothing portion 43 includes an adding portion 71, a memory 72, a dividing portion 73 and a gate GT3. The gate GT3 is controlled so as to open only during the period T3, and the reception data S3 are permitted to pass during this period T3. Note that the period T3 corresponds to the time domain waveform with end portions of the waveform cut off.

The adding portion 71 adds each data vale of each sampling position for the reception data S3 that correspond to plural time domain waveforms to be obtained on one detecting operation.

In other words, it is supposed that the reception data S3 is obtained corresponding to 32 time domain waveforms in one detecting operation, for example. The reception data S3 of the first time, the second time, the third time, the m-th time, ... the 32nd time are represented by D1, D2, D3, Dm, ... D32, respectively. Then, the following relationships are satisfied.

$$D1 = R1(0) + R1(1) + R1(2) + \ldots + R1(255)$$

$$D2 = R2(0) + R2(1) + R2(2) + \ldots + R2(255)$$

$$\ldots$$

$$Dm = Rm(0) + Rm(1) + Rm(2) + \ldots + Rm(255)$$

$$\ldots$$

$$D32 = R32(0) + R32(1) + R32(2) + \ldots + R32(255)$$

Here, $Rm(n)$ indicates n-th sampling data of m-th reception data S3. In this example, it is supposed that 256 sampling data are obtained from one reception signal S2.

The adding portion 71 calculates a sum value $\Sigma R(n)$ of sampling data from the first through the 32nd times (m=1-32) for each value of n (=0, 1, 2, ...) of each sampling position. The memory 72 stores sampling data for each sampling position. As a result, the sum value $\Sigma R(n)$ of 32 times for each sampling position added by the adding portion 71 is stored in the memory 72.

The dividing portion 73 divides the sum value $\Sigma R(n)$ for each sampling position stored in the memory 72 by 32 each that is the number of total times. The dividing portion 73 delivers the reception data S4 that are an average value of 32 reception data S3 in one detecting operation.

Therefore, even if some noises are contained in the 32 reception data S3, the noises are averaged and are not conspicuous in the reception data S4. In this way, one-shot noises that are generated impulsively can be eliminated effectively. Note that the timing of the sampling position can be determined in accordance with the timing of the reference signal S0 described above.

A touch position is detected by the control portion 45 in accordance with the reception data S4 delivered from the smoothing portion 43. In other words, the control portion 45 includes a memory 65, an operational portion 66 and a counter 67. In addition, it includes an operation input portion and a display portion, if necessary.

The memory 65 stores a reference time domain waveform DR that is obtained when no object touches the panel, a slice time domain waveform DS that is obtained by subtracting a predetermined slice value (threshold) thd from the reference time domain waveform DR, and the slice value thd. The reference time domain waveform DR is, for example, digital data in the same sampling period as that of the reception data S3 and is obtained by an initialization process when the touch panel device 1 is powered on. After that the reference time domain waveform DR is updated regularly. The threshold thd can also be changed.

Although the operational portion 66 is structured by using hardware logic, it is possible to constitute the same using an MPU, a ROM and a RAM so as to realize the function by executing a program. It is also possible to structure the same by combining the hardware and the software.

The operational portion 66 compares the time domain waveform of the reception data S4 with the slice time domain waveform DS that is read out of the memory 65. In other words, time points t1 and t2 at intersections of the reception data S4 and the slice time domain waveform DS are detected as shown in FIG. 6. A touch position in the touch area TE is calculated in accordance with the detected time points t1 and t2, the slice value thd and the like. Note that the aforementioned patent document may be referred to for more detailed description of the method for determining a touch position.

Next, the noise detection portion 44 detects noises contained in the reception data S2 (reception signal S3). As described above in the prior art, the reception signal S2 often contains noises due to radio waves emitted by cellular phones for example. If a cellular phone is used near the touch panel device 1, various levels of noises enter the touch panel device 1 depending on a distance between the touch panel device 1 and the cellular phone. If the reception signal S2 contains a large level of noise, the reception signal S4 will be distorted so that a touch position cannot be detected correctly.

As shown in FIG. 2, the noise detection portion 44 includes a first noise detection portion 63 and a second noise detection portion 64. As shown in FIG. 3, the first noise detection portion 63 includes a delay portion 74, a differential operational portion 75, a comparing portion 76, a decision portion 77, a threshold storage portion 78 and a gate GT1. The second noise detection portion 64 includes a threshold storage portion 79, a comparing portion 80, a decision portion 81 and a gate GT2.

In the first noise detection portion 63, the gate GT1 is controlled to open only during a predetermined period T3 so as to allow the reception data S3 to pass during the period T3. The delay portion 74 stores reception data S3 that correspond to one reception time domain waveform delivered from the A/D converter 62. In this way, the reception data S3 are delayed by the time corresponding to one time domain waveform. The differential operational portion 75 performs an operation for determining the differential SBm between the reception data S3 corresponding to the present reception time domain waveform delivered from the A/D converter 62 and the reception data S3 corresponding to the previous reception time domain waveform stored in the delay portion 74. The comparing portion 76 compares the differential SBm delivered from the differential operational portion 75 with the threshold value th1 of the threshold storage portion 78 so as to deliver a comparison result. The comparing portion 76 delivers the comparison result for each of the sampling data. The decision portion 77 decides whether noises are contained or not in accordance with the comparison result from the comparing portion 76.

In the second noise detection portion 64, the gate GT2 is controlled to open only during a predetermined period T4 (see FIG. 11) so as to allow the noise floor NF to pass during the period T4. The comparing portion 80 compares a level of the noise floor NF with a threshold value th2 of the threshold storage portion 79 so as to deliver a comparison result. The decision portion 81 decides whether noises are contained or not in accordance with the comparison result from the comparing portion 80.

Note that a signal that is given to the gates GT1-GT3 for determining the periods T3 and T4 are delivered from the control portion 45 for example.

Hereinafter, the operation of the noise detection portion 44 will be described more in detail.

As shown in FIG. 8, noises from a cellular phone may disturb the reception signal. In the example shown in FIG. 8, the time domain waveform is disturbed by the noises, and the noise floor is raised between the time domain waveform and the time domain waveform. If the time domain waveform is disturbed to the extent shown in FIG. 8, it is difficult to detect a touch position correctly.

Therefore, the first noise detection portion 63 and the second noise detection portion 64 perform the following two types of noise detection processes according to this embodiment.

(1) The first noise detection portion 63 detects the differential SBm between the present time domain waveform and the previous time domain waveform in the burst wave BW, and it is decided that noises are contained if the differential SBm exceeds the first threshold value th1.

(2) The second noise detection portion 64 monitors the noise floor and decide that noises are contained if a level of the noise floor exceeds the second threshold value th2.

In FIG. 9 there are shown the differential between the time domain waveform at a certain time point and the previous time domain waveform as noise 1 and noise 2. The noise 1 shows the case where a cellular phone approaches very closely to the touch panel device 1, and the noise 2 shows the case where the cellular phone is apart from the touch panel device 1 by approximately 1 meter. Note that there is a differential that is indicated as "fluctuation" in FIG. 9 even if there is no noise. Therefore, the threshold value th1 is set to a value that is larger than a normal fluctuation component so that the fluctuation component is not detected but the noises 1 and 2 having larger levels can be detected.

In other words, the differential SBm is obtained when Dm−1 that is the previous reception data S4 is subtracted from Dm that is the present reception data S4 as shown in FIG. 10. The differential SBm is obtained for each of the sampling data of the time domain waveform. The differential SBm is small in the normal state without noises as shown in (A) of FIG. 10, while the differential SBm is large in the state with noises as shown in (B) of FIG. 10. The threshold value th1 is set to an appropriate value so that the above two cases can be distinguished from each other.

In addition, the threshold value th2 is set to an appropriate value so that the case where the noise floor NF is raised as shown in FIG. 11 can be distinguished from the case without noises. Note that a period T4 for detecting the noise floor NF is a period other than the period while the reception signal due to the burst wave BW can be obtained.

Such threshold values th1 and th2 may be set in accordance with a design value of the touch panel device 1. In addition, they may be set by a real operation of the device in a factory or in accordance with a situation of a site where the device is installed. It is also possible to set them every time when the drive control portion 3 is activated. In addition, the setting may be updated in accordance with a change in the situation of the site or an aged deterioration thereof.

For example, it is possible to provide a counter for counting the number of times when the differential SBm exceeds the threshold value th1 and to change the threshold value th1 when a value of the counter reaches a predetermined value. It can be applied to the threshold value th2 in the same way. Such a process of updating the threshold values can be performed under control of the control portion 45, for example.

Note that the decision portions 77 and 81 decide that a noise is contained if the sampling data exceed the threshold values th1 and th2 even once, for example. Alternatively, they decide that a noise is contained if a predetermined number of sampling data exceed the threshold values th1 and th2 for one burst wave BW. Still alternatively, they decide that a noise is contained if a predetermined number of sampling data exceed the threshold values th1 and th2 successively. Any of the methods can be adopted in accordance with a situation of noises on the site or the like.

If a noise is detected by the above-mentioned method, it is controlled so that the detection process of an object (a detection process of a touch position) is not performed in accordance with the reception signal S2. In other words, decision signals S5 and S6 delivered from the decision portions 77 and 81 are supplied to the control portion 45. The control portion 45 controls the detection process of a touch position in the control portion 45 and operations of the oscillation portion 41 and the like in accordance with the decision signals S5 and S6.

In other words, when a noise is detected, the reception data S4 with the noise are abandoned for example. Then, after a predetermined time (a wait time TW1) has passed, the detecting operation is restarted. If a noise at the noise floor NF is detected, the detection process and the detecting operation are stopped at the time point when the noise is detected. The oscillation portion 41 stops excitation of the burst wave BW during this period. Then, after a predetermined time (a wait time TW2) has passed, the detecting operation is restarted.

As the wait times TW1 and TW2, appropriate values are set in accordance with a situation of noise generation or the like. For example, a value within the range of few milliseconds to a few tens of milliseconds is set. Concerning noises due to a cellular phone, it often emits an intermittent radio wave that is turned on and off every 20-30 milliseconds. In this case, a value within the range of 10-20 milliseconds is set to the wait times TW1 and TW2, for example. Then, the next detecting operation will be performed without noises at high probability. Note that the same value or different values may be set to the wait times TW1 and TW2.

Next, a general operation of the touch panel device 1 will be described with reference to flowcharts.

Figure 12:
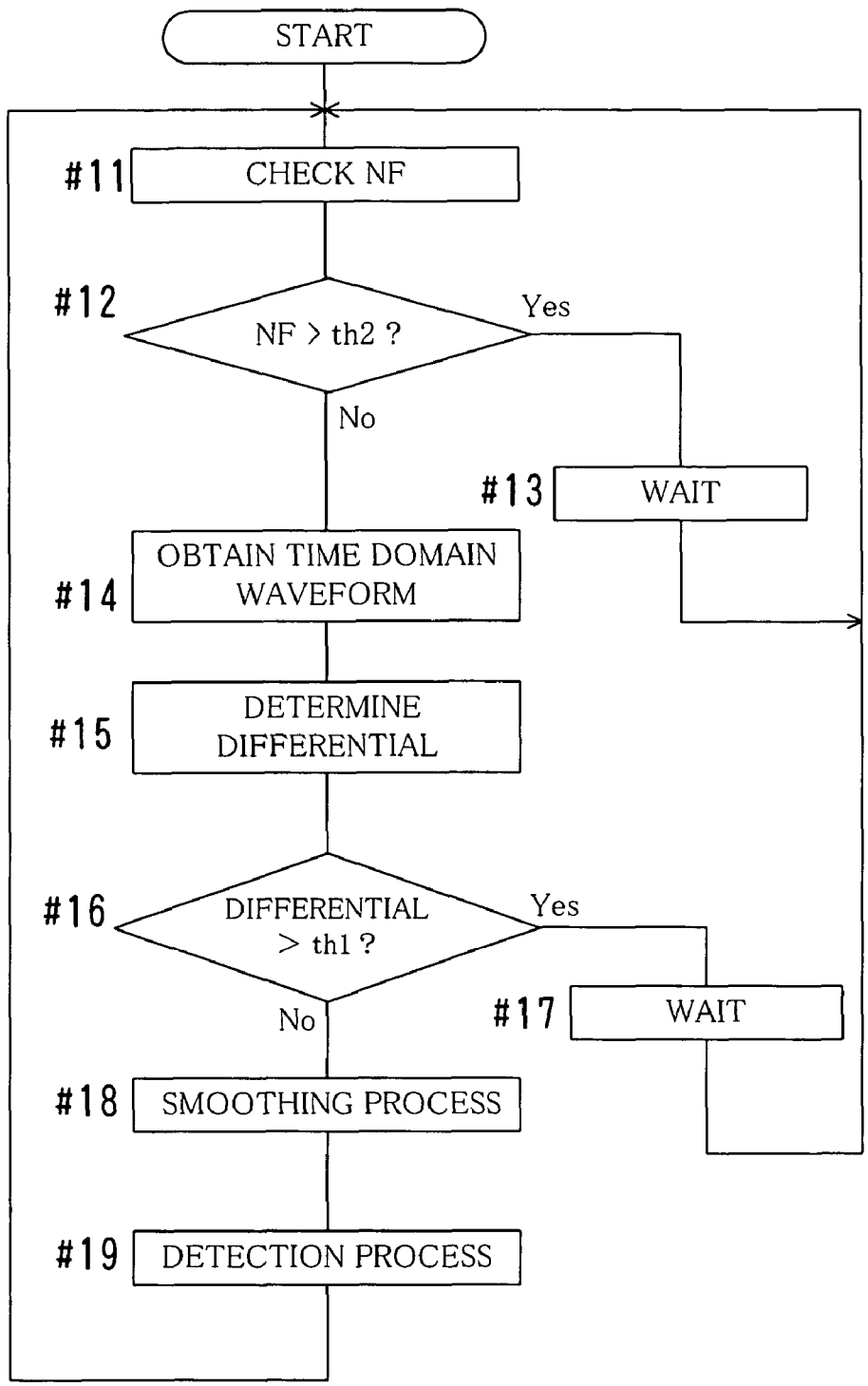
FIG. 12 is a flowchart showing a general process operation of the touch panel device.

FIG. 12 is a flowchart showing a general process operation of the touch panel device 1.

As shown in FIG. 12, the noise floor NF is checked (#11), and it is decided whether or not a level of the noise floor NF exceeds the threshold value th2 (#12). If the noise floor NF exceeds the threshold value th2 (Yes in #12), the process is halted for a predetermined wait time TW (#13). In other words, the burst wave BW is not delivered from the oscillation portion 41 for this time period, for example. When the wait time TW passes, the process is restarted from the first step in the flowchart.

If the noise floor NF is the threshold value th2 or lower, the reference signal S0 is delivered so as to produce the burst wave BW for example. The time domain waveform is obtained in accordance with the reception signal S2 (#14). Then, the differential SBm for each time is determined for the time domain waveform (#15). If the differential SBm exceeds the threshold value th1 (Yes in #16), the process is halted during a predetermined wait time TW (#17). After that, the process is restarted from the first step of the flowchart.

If the differential SBm is the threshold value th1 or lower (No in #16), the reception data S4 that is smoothed by the smoothing portion 43 is used for performing the detection process of a touch position (#18 and #19).

It is possible to set a flag for example when a noise is detected, so that the detection process is restarted from the first step.

Thus, the touch panel device 1 according to this embodiment includes two noise detection portions 63 and 64 as the noise detection portion 44 for checking noises in the reception data S3, and the detection result is fed back to the control portion 45. Thus, the process of detecting a touch position is halted during a period when the noise is generated. Therefore, the process of detecting a touch position is performed only for the reception data S3 without a noise, and a detection error due to a noise can be prevented. In addition, as an influence of a noise is reduced, the slice value thd can be decreased so that sensitivity in detection of a touch position can be enhanced. Thus, even a light touch on the panel can be detected.

According to this embodiment, noises can be eliminated effectively by a simple structure in which the noise detection portion 44 is added to the drive control portion 3 and the control portion 45 performs a simple control. In addition, as the surface acoustic wave is not delivered during the period when a noise is detected and a weight is applied, power consumption during the period can be suppressed.

Although 32 excitation signals S1 are delivered as the burst wave BW in the embodiment described above, other number of times can be adopted. It is possible that the number of times is variable. It is possible that the number of pulses in one excitation signal S1 can be changed by the control portion 45 if necessary. The periods T1-T4 may be other appropriate values without limited to the above-exemplified values. The sampling period and the number of sampling data of the reception data S3 can be changed to values other than the above-exemplified values.

In the embodiment described above, the differential SBm is determined in accordance with the present reception data S3 and the previous reception data S3. Instead, the differential SBm may be determined in accordance with the reception data S3 and a reference waveform. For example, the reception data S3 corresponding to the first time domain waveform is used as the reference waveform, and the reception data S3 corresponding to the time domain waveform of each time is compared with the reference waveform so as to determine the differential SBm.

In the embodiment described above, the decision signals S5 and S6 are delivered from the noise detection portions 63 and 64 to the control portion 45 so that the control portion 45 controls operations of the oscillation portion 41 and the like. Alternatively, the decision signals S5 and S6 may be delivered directly to the oscillation portion 41 so that an operation of the oscillation portion 41 is controlled directly. In this case, the circuit structure of the drive control portion 3 is simplified more. In other words, a detection error due to a noise can be prevented by a simple logic structure without using an MPU or a CPU in the control portion 45, for example. In addition, although two noise detection portions 63 and 64 are provided in the embodiment described above, one of them can be eliminated so that only the other detects a noise.

Furthermore, the structure of the whole or a part of the noise detection portions 63 and 64, the smoothing portion 43, the control portion 45, the drive control portion 3 and the touch panel device 1, and the circuit thereof, the shape, the dimensions, the number, the material and the value thereof, the contents and the order of the process and timings thereof can be modified, if necessary, in accordance with the spirit of the present invention.

The touch panel device according to the present invention can be utilized as an input device of a personal computer, a mobile computer, a portable information terminal or other type of device.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. A control method for eliminating noises in a touch panel device including an excitation transducer for exciting a surface acoustic wave upon application of a burst wave and a reception transducer for receiving the surface acoustic wave and converting the same into a reception signal that are arranged at a peripheral portion of a detection area so that a position of an object touching the detection area is detected in accordance with a change in the reception signal in a given single detecting operation during which a plurality of burst waves are applied, the control method comprising:

obtaining, in said given single detecting operation, the reception signal comprising a plurality of time domain waveforms each of which corresponding to each of the plurality of burst waves that are applied, said given single detecting operation comprising a plurality of first periods each of which corresponding to a period of each of the plurality of time domain waveforms and a plurality of second periods each of which corresponding to a period between but excluding any two of the plurality of time domain waveforms that are adjacent to each other;

comparing, in said given single detecting operation, a difference between one of the time domain waveforms of the reception signal that is allowed to pass through in one of the plurality of first periods and another of the time domain waveforms of the reception signal that is allowed to pass through in another of the plurality of first periods immediately following said one of the plurality of first periods, with a first threshold value, the difference being taken between said one of the time domain waveforms and said another of the time domain waveforms at positions corresponding to each other on a time axis of the time domain waveforms;

determining that a first noise is present when said difference exceeds the first threshold value, and determining that the first noise is absent when said difference does not exceed the first threshold value;

comparing, in said given single detecting operation, a signal level of the reception signal allowed to pass through in any of the plurality of second periods with a second threshold value;

determining that a second noise is present when the signal level of the reception signal allowed to pass through in said any of the plurality of second periods exceeds the second threshold value, and determining that the second noise is absent when the signal level of the reception signal allowed to pass through in all of the plurality of second periods remains at or below the second threshold value; and detecting the position of the object based on the reception signal in said given single detecting operation only if it is determined that both the first noise and the second noise are absent, and skipping detecting the position of the object if it is determined that at least one of the first noise and the second noise is present.

2. The control method according to claim 1, further comprising stopping an application of the plurality of burst waves until a preset wait time passes and restarting the application of the plurality of burst waves after the wait time has passed if it is determined that the first noise is present.

3. The control method according to claim 1, further comprising
stopping an application of the plurality of burst waves until a preset wait time passes, and restarting the application of the plurality of burst waves after the wait time has passed if it is determined that the second noise is present.

4. A control device for eliminating noises in a touch panel device including an excitation transducer for exciting a surface acoustic wave upon application of a burst wave and a reception transducer for receiving the surface acoustic wave and converting the same into a reception signal that are arranged at a peripheral portion of a detection area so that a position of an object touching the detection area is detected in accordance with a change in the reception signal in a given single detecting operation during which a plurality of burst waves are applied, the control device comprising:

a reception portion that obtains, in said given single detecting operation, the reception signal comprising a plurality of time domain waveforms each of which corresponding to each of a plurality of burst waves that are applied, said given single detecting operation comprising a plurality of first periods each of which corresponding to a period of each of the plurality of time domain waveforms and a plurality of second periods each of which corresponding to a period between but excluding any two of the plurality of time domain waveforms that are adjacent to each other;

a noise detecting portion that obtains, in said given single detecting operation, a difference between one of the time domain waveforms of the reception signal that is allowed to pass through in one of the plurality of first periods and another of the time domain waveforms of the reception signal that is allowed to pass through in another of the plurality of first periods immediately following said one of the plurality of first periods, at positions corresponding to each other on a time axis of the time domain waveforms, compares the difference thus obtained with a first threshold value, determines that a first noise is present when said difference exceeds the first threshold value, and determines that the first noise is absent when said difference does not exceed the first threshold value, also compares, in said given single detecting operation, a signal level of the reception signal allowed to pass through in any of the plurality of second periods with a second threshold value, and determines that a second noise is present when the signal level of the reception signal allowed to pass through in said any of the plurality of second periods exceeds the second threshold value, and determines that the second noise is absent when the signal level of the reception signal allowed to pass through in all of the plurality of second periods remains at or below the second threshold value; and a control portion that detects the position of the object based on the reception signal in said given single detecting operation only if the noise detecting portion determines that both the first noise and the second noise are absent, and skips detecting the position of the object if the noise detecting portion determines that at least one of the first noise and the second noise is present.

5. The control device according to claim 4, wherein the control portion performs a control operation to stop an application of the plurality of burst waves until a preset wait time passes and to restart the application of the plurality of burst waves after the wait time has passed if noise detecting portion determines that the first noise is present.

6. The control device according to claim 4, further comprising
a count portion that counts a number of instances in which the difference exceeds the first threshold value, and a threshold change portion that changes the first threshold value when the number of instances counted by the count portion exceeds a predetermined value.

7. A control device for eliminating noises in a touch panel device including an excitation transducer for exciting a surface acoustic wave upon application of a burst wave and a reception transducer for receiving the surface acoustic wave and converting the same into a reception signal that are arranged at a peripheral portion of a detection area so that a position of an object touching the detection area is detected in accordance with a change in the reception signal in a given single detecting operation during which a plurality of burst waves are applied, the control device comprising:

a reception portion that obtains, in said given single detecting operation, a first reception signal and performs A/D conversion on the first reception signal so as to produce a second reception signal comprising a plurality of time domain waveforms each of which corresponding to each of a plurality of burst waves that are applied, said given single detecting operation comprising a plurality of first periods each of which corresponding to a period of each of the plurality of time domain waveforms and a plurality of second periods each of which corresponding to a period between but excluding any two of the plurality of time domain waveforms that are adjacent to each other;

a first noise detecting portion that obtains, in said given single detecting operation, a difference between one of the time domain waveforms of the second reception signal that is allowed to pass through in one of the plurality of first period and another of the time domain waveforms of the second reception signal that is allowed to pass through in another of the plurality of first periods immediately following said one of the plurality of first periods, at positions corresponding to each other on a time axis of the time domain waveforms, compares the difference thus obtained with a first threshold value, and determines that a first noise is present when said difference exceeds the first threshold value, and determines that the first noise is absent when said difference does not exceed the first threshold value;

a second noise detecting portion that compares, in said given single detecting operation, a signal level of the second reception signal allowed to pass through in any of the plurality of second periods with a second threshold value, determines that a second noise is present when the signal level in said any of the plurality of second periods exceeds the second threshold value, and determines that the second noise is absent when the signal level in all of the plurality of second periods remains at or below the second threshold value;

a smoothing portion that smoothes, in said given single detecting operation, the second reception signal into a third reception signal; and a control portion that detects, in said given single detecting operation, the position of the object based on the third reception signal only if the first noise detecting portion determines that the first noise is absent and at the same time the second noise detecting portion determines that the second noise is also absent, and skips detecting the position of the object if the first noise detecting portion determines that the first noise is present or the second noise detecting portion determines that the second noise is present.

8. The touch panel device according to claim 7, wherein the control portion performs a control operation to stop an application of the plurality of burst waves until a preset wait time passes and restart the application of the plurality of burst waves after the wait time has passed if the the first noise detecting portion determines that the first noise is present or the second noise detecting portion determines that the second noise is present.

* * * * *